April 22, 1969    J. H. REIFENBERG    3,440,399
DOMESTIC DISHWASHER AND CONTROL
Filed Jan. 12, 1966

WITNESSES:
John L. Chopp
James F. Young

INVENTOR
Joseph H. Reifenberg
BY Edward C. Arenz
ATTORNEY

United States Patent Office 3,440,399
Patented Apr. 22, 1969

3,440,399
DOMESTIC DISHWASHER AND CONTROL
Joseph H. Reifenberg, Columbus, Ohio, assignor to Westinghouse Electric Corporation, Pittsburgh, Pa., a corporation of Pennsylvania
Filed Jan. 12, 1966, Ser. No. 520,118
Int. Cl. F24h *1/00*
U.S. Cl. 219—334         5 Claims

ABSTRACT OF THE DISCLOSURE

A domestic dishwasher control arrangement in which a heating element of relatively high wattage is cyclically energized during certain portions of the operating cycle to provide an effectively low wattage output, and during other portions of the operating cycle is continuously energized to provide high wattage output.

---

This invention relates in general to domestic dishwashing machines, and in particular to control means therefor.

In some installations the domestic hot water supply has been inadequate to permit use of a conventional automatic dishwasher which has only a relatively low wattage internal electric heating element for boosting the washing water temperature and to provide heat for drying. It has usually been the practice in those cases to provide an additional high wattage output electric heating element properly controlled to heat the water. Typically, the high wattage element is not energized during a drying cycle, and the second lower wattage output element is used for providing heat for drying the dishes. The requirement for the two separate elements stems from the low wattage element being inadequate to heat the water in a reasonable length of time, and the high wattage element creating excessive temperatures within the dishwasher when no water is present. One such dishwashing machine provided with the dual heaters is disclosed and claimed in Dronberger, U.S. Patent 3,173,432.

The object of this invention is the provision of a dishwashing machine provided with a single heating element and a control system adapting it for use in either a cold water installation, or a hot water installation.

A further object of this invention is the provision of such a dishwasher and control system which is of relatively simple character and adapted to various cycles of control.

In accordance with my invention, I provide a single, relatively high wattage electrical heating element in the washing chamber. This heater is cyclically energized during those portions of the operating cycle of the washer when low wattage heating is desirable, and is continuously energized to provide high wattage output during certain other portions of the cycle when water is to be heated to a high temperature.

The currently preferred arrangement according to the invention includes: a timer motor driving timing means for periodically closing and opening circuits to the various operating components of the dishwasher in the manner of conventional dishwashers; a thermal cycling switch arranged to be connected in series with the heater during certain portions of the cycle to produce a low wattage; an alternate connection for the heater shunting out the thermal cycling switch so the heater produces the high wattage; the timing means deenergizing the timer motor when the full wattage connection to the heater is made; and thermostatically responsive switch means for restoring energization to the timer motor to thereby return to the normal cycle when the water reaches a desired high temperature.

Figure 1:
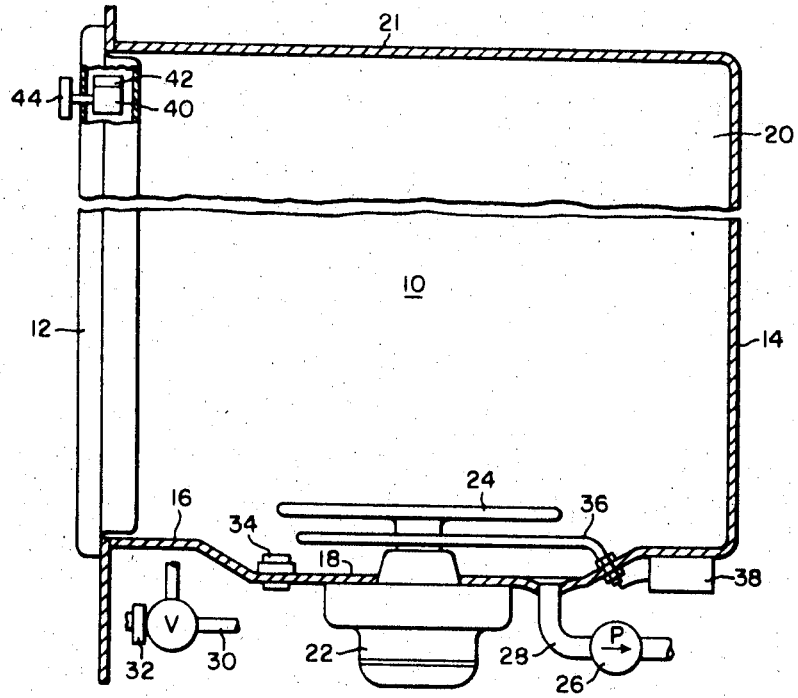
Figure 2:
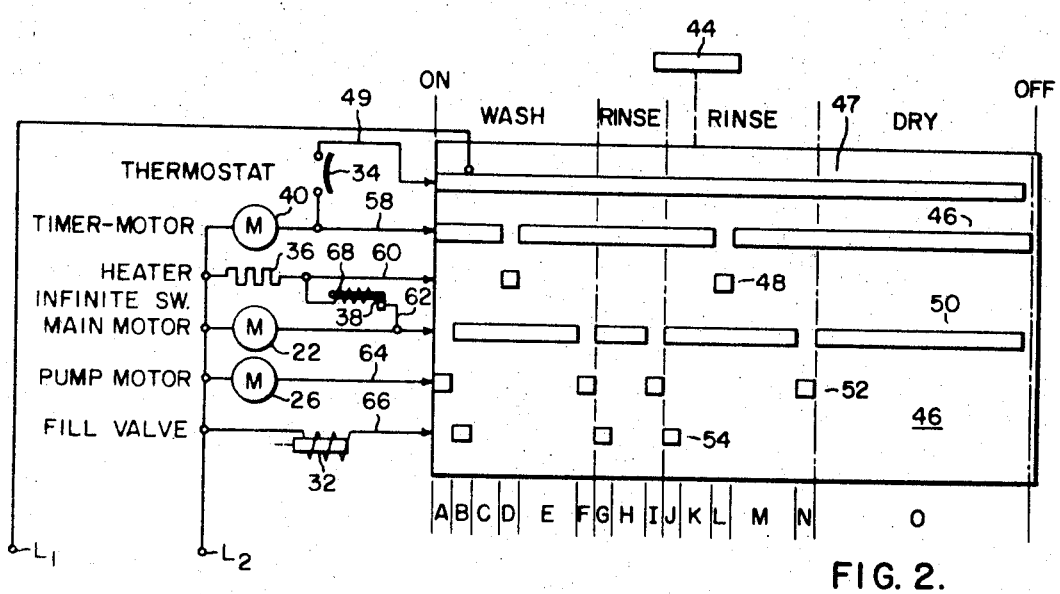

The invention will be described in connection with the accompanying drawing illustrating a presently preferred embodiment by way of example, and wherein:

FIGURE 1 is a fragmentary side view, partly diagrammatic, and partly in section, of a domestic dishwasher embodying the invention; and FIG. 2 is a diagrammatic view of the control arrangement and a developed timer cycle chart showing typical operational sequences during a complete cycle of operation of the washer.

Referring to the drawing, the invention is shown as incorporated in a front opening type of under counter dishwasher. The washing chamber 10 is defined by a front door 12, a rear upright wall 14, a bottom wall 16 with a central depressed sump 18, opposite upright side walls 20, and a top wall 21. The dishes to be washed in the washing chamber are supported in suitable open work dish racks (not shown).

The various operating components for the dishwasher are shown in partly diagrammatic form in FIG. 1. The water connections between various parts are only partly shown in FIG. 1 since they may be conventional. A main motor 22 is mounted below the bottom wall sump 18 and is connected to drive a rotatable spray arm 24 located in the lower portion of the washing chamber 10. The main motor 22 may have associated therewith recirculation pump means for circulating water from the sump back into the spray arm 24 in some embodiments. Additionally, fan means may be associated with the main motor 22 to provide circulation of air to promote drying of the dishes.

A water pump 26 is provided in the drain connection line 28 for removing dirtied water from the machine at appropriate times. The water for washing and rinsing is admitted to the chamber through a supply line 30 having a solenoid fill valve 32.

In addition to the spray arm 24 within the washing chamber 10, a thermostat 34 is mounted in the sump 18 to sense the temperature of the water in the sump, and a single, relatively high wattage electrical heater 36 is secured to the tub bottom 16 and extends in an arc or other geometric pattern about the central area of the tub bottom closely adjacent the sump area 18. For purposes of a preferred example, the heater may be a resistance heating element which delivers 2750 watts when connected directly across a 115 volt line. A thermal cycling switch 38 is associated with the heater and is located exteriorly of the washing chamber, and functions in a manner to be later explained.

A timer motor 40 with associated timing means 42 may conveniently be located in the upper portion of the front door 12 and is provided with a manually operated knob 44 accessible from the exterior of the dishwasher for initiating the operation of the dishwasher by rotating the knob.

The connections between the electrical components described in connection with FIG. 1 are shown in FIG. 2 in association with a chart indicating the sequence of operations during a complete cycle of typical character. The timing means 42 is shown in the form of a cylinder laid out in developed form and in which the bar portions indicate conductive surfaces commonly connected (connections not shown) to one side of the supply L1. Various portions of the cycle corresponding to time periods are indicated by the alphabetical divisions from left to right along the base of the chart 42. Each of the lengths from left to right indicated by an alphabetical division are directly proportional to time except for the divisions indicated by the letters D and L. It is to be understood that the timer motor 40 drives the timing means 42 when the timer motor is energized. Additionally, the control knob 44 may be used to manually drive the timing means 42.

The electrical power supply is indicated by the lines

L1 and L2. The arrows at the left edge of the chart identified as the "on" edge represent pickup brushes or the like which connect the various components to which they are attached to the L1 side of the power line. It is again noted that each of the bar portions on the timing means 42 is directly connected to the L1 side of the line, although the connecting lines are omitted to enhance the clarity of the chart.

The timer motor 40 is energized through one circuit which includes the line L1, any portion of the segmented bar 46, and its pickup brush line 58 connected to the one side of the timer motor 40. The timer motor 40 may also be energized through an alternative circuit which includes the power line L1, the continuous bar 47, pickup line 49, and the normally open thermostatic switch 34 when closed in response to a predetermined high temperature such as 145° F. to 150° F. sensed within the sump.

The heater 36 is connected directly across the line for a high wattage output when its associated pickup line 60 contacts one of the segments of the bar 48 shown immediately below the timer conductive surface segments 46. The heater 36 may be connected in an alternate circuit to provide an effectively low wattage output when it is energized through a circuit including line L1, the segment surfaces 50, the pickup line 62 which serves both the thermal cycling switch 38 and the main motor 22, and the heater 36 having its opposite side connected to the line L2. Accordingly, it will be appreciated that when the heater 36 is connected through pickup line 60 to the conductive surface segments 48, the thermal cycling switch 38 is shorted out.

The pump motor 26 is energized when its pickup line 64 is connected to the conductive surface segments 52, and the fill valve solenoid 32 is energized when its pickup line 66 is connected to the conductive surface segments 54.

Before proceeding with a description of the machine during a complete cycle, the general character of the thermal cycling switch 38 will be explained. A thermal cycling switch, sometimes called an infinite switch, generally includes a bimetallic contact arm, and a heater element (indicated by the helical line 68 in FIG. 2) in close proximity to the bimetallic contact arm and energized to emit heat when the switch is closed and current is flowing through the contacts. The thermal cycling switch is normally in a closed position so with current flowing through the heating coil 68 the bimetallic contact arm is heated and moves to an open position at a predetermined temperature. This opens the circuit through the switch, and through the heater. The bimetallic element then cools and moves to a closed position to restore current flow through the switch and through the heater. Means are provided to adjust the bias of the contact arm to a closed position so that the period during which current must flow through the heater before the arm will operate to an open position may be varied in accordance with the particular service in which the switch is employed. One switch of this general character is described in Risacher et al., U.S. Patent 2,813,173 for example. In most cases, these thermal cycling switches include substantial additional structure not described for purposes of obtaining a more sophisticated operation such as compensation for the differential between ambient temperature and the sensed temperature, and the like. In the case of the present invention it is preferred that the means biasing the switch to a closed position be set so that the heater 36 when energized through the thermal cycling switch will produce an effective low wattage output of about 750 watts which has been found quite satisfactory for purposes of drying articles in a dishwasher.

When the dishwasher is initially energized by manually advancing the control knob 44 to turn the timing cylinder 42, the timer motor 40 is energized from line L1 through contact segments 46, pickup line 58, and thereby starts the incremental advance of the timing cylinder 42. The pump motor 26 is simultaneously energized to purge the sump of residual water during the time period A. During the period B, the fill valve solenoid 32 is energized through the contact segments 54 and pickup line 66 to admit wash water, and the main motor 22 is energized through segments 52 and pickup line 62 so that it begins hurling wash water about the washing chamber. The heater 36 is energized as well during period B through the thermal cycling switch which provides heating at the effectively low wattage rate of 750 watts. The fill valve solenoid is deenergized at the end of period B closing the fill valve, while the energization of the main motor, and the heater at its effectively low wattage rate, continues through period C. If the water admitted during period B, with the heat imparted to it at the effectively low wattage rate, is sufficient to close the thermostatic switch 34 when period D is reached, the timer motor will continue to be energized through the thermostat and will move the timing cylinder 42 through the very small gap represented by period D. This re-establishes energization of the timing motor through the circuit of the contact segments 46 and pickup line 58. However, ordinarily the installation will be such that the water admitted to the chamber will be sufficiently cold that considerable additional heat will be required to bring the temperature of the water up to the proper value when the cycle reaches the beginning of period D. Accordingly, the thermostat 34 will be in its normally open position, and the timer motor will be deenergized by virtue of the gap in contact segments 46 at period D. The main motor 22 remains energized, and the heater 36 is connected directly across the line to deliver full wattage output through pickup line 60 paralleling the thermal cycling switch 38. It is noted that the D period, and the subsequent L period, are periods of time which are not of a specific duration as in the case of the other periods. This is of course due to the absence of timer motor operation during the D and L periods until the thermostat 34 is closed.

When the wash water in the chamber reaches the closing temperature of the thermostat 34, the timer motor is reenergized through the thermostatic switch shunt connection and the timing cylinder 42 is incrementally advanced for resumption of the normal connection to the timer motor through the contact segments 46. The cycle illustrated continues with the main washing occurring during period E, a water pumpout taking place during period F with a subsequent refill of water for a rinse during period G, the rinsing continuing during periods G and H, another pumpout during period I followed by a refill for a rinse during period J, and continued rinsing with water heated only by the effective low wattage of the heater 36 during the period K. Then, during period L, the heater is again energized at its high wattage output level to heat the water to the thermostatic set point. The thermostat contacts close, in response to the high temperature, to again energize the timer motor and cause movement of the timing cylinder 42 into the period M. After the hot rinse period M ends, the water is pumped out during the N period, and the washer goes into its drying period O. During this drying period the thermal cycling switch operates in on and off fashion to give the effective low wattage output for drying at the end of the O period, the timer motor moves the cylinder into an off period. The machine is started the next time by again turning the control knob 44 manually as previously explained.

It will be appreciated that the specific control cycle described is simply by way of example and that additional periods of energization of the heater 36 at its high wattage output level may be provided in accordance with the desirability of such. The control arrangement is such that if the machine is initially installed in a cold water application, its subsequent use in a hot water application is possible without requiring any changes in the control circuit. As used in a hot water application, the thermostat 34 will simply close before the D and L periods are reached in each instance, and energization of the heater 36 at its high wattage output level will be only momentary in each instance. It will be further appreciated that the use of a single heater, rather than two heaters, provides certain side benefits such as requiring only one opening in the tub for the heater mounting and electrical connections to be made, and the tub interior is less cluttered by virtue of only a single heating element being present. It is also noted that the thermal cycling switch may have an independent pickup line to the timing cylinder 42 with its own set of contact segments so that the energization of the heater for its effectively low wattage output need not coincide with the energization of the main motor 22. However, the control arrangement shown is that preferred from a cost standpoint since the coincidental energization of the heater 36 at the effective low wattage output is not disadvantageous.

Having described the invention, I claim:

1. In a domestic dishwasher:
a washing chamber;
a high wattage output heater in said chamber;
electrically driven timing means for normally controlling the sequence of operations in a washing cycle;
a thermal cycling switch;
first circuit means adapted to be completed by said timing means for connecting said heater in series with said thermal cycling switch for selected portions of said cycle to energize said heater intermittently for effectively low wattage output;
alternate circuit means in parallel with said thermal cycling switch adapted to be completed by said timing means during other portions of said cycle to bypass said thermal cycling means and thereby energize said heater at its high wattage output level for heating water introduced to said chamber;
means operable by said timing means to interrupt energization of said timing means when said alternate circuit means is completed; and
thermostatically controlled switch means in series with said timing means for restoring energization of said timing means independently of said timing means in response to elevation of said water to a predetermined high temperature.

2. In a domestic dishwasher according to claim 1:
said means interrupting energization of said timing means includes a circuit adapted to be opened by said timing means.

3. In a domestic dishwasher according to claim 1:
said timing means includes means completing said first circuit means to said thermal cycling switch during periods when said alternate circuit means is completed.

4. In a domestic dishwasher:
a washing chamber into which water is received;
a single high wattage heater in said chamber;
timing means for normally controlling the sequence of operations of said dishwasher;
a timer motor for driving said timing means;
a normally open thermostatic switch responsive to water temperature in said chamber;
a thermal cycling switch connected in series with said heater;
means operable by said timing means for energizing said heater through said thermal cycling switch for selected periods during said sequence of operations to provide an effective low wattage output of said heater;
means operable by said timing means for bypassing said thermal cycling switch and thereby energizing said heater for said high wattage output during other selected periods of said sequence of operations, and for simultaneously deenergizing said timer motor; and
a circuit adapted to be closed by said thermostatic switch in a closed position responsive to a predetermined high temperature of said water to energize said timer motor independently of said timing means to move said timing means to a position deenergizing said heater for high wattage output.

5. In a domestic dishwasher according to claim 4:
means for controlling the periods of admission of said water to said chamber;
said timing means includes means operable by said timing means to establish a circuit for energizing said heater for said high wattage output following selected periods of admission of said water to said chamber.

References Cited

UNITED STATES PATENTS

| | | | |
|---|---|---|---|
| 2,781,765 | 2/1957 | Steidley | 134—57 |
| 3,173,432 | 3/1965 | Dronberger | 219—321 |
| 3,186,417 | 6/1965 | Fay | 134—108 X |
| 3,207,164 | 9/1965 | Fay | 134—57 |

ANTHONY BARTIS, *Primary Examiner.*

U.S. Cl. X.R.

134—57, 108; 219—328, 493